US012449115B2

(12) United States Patent
Zhao et al.

(10) Patent No.: US 12,449,115 B2
(45) Date of Patent: Oct. 21, 2025

(54) MAGNETIC ABSORBING GUIDE RAIL COMPONENT AND LIGHTING SYSTEM

(71) Applicants: OPPLE LIGHTING CO., LTD., Shanghai (CN); SUZHOU OPPLE LIGHTING CO., LTD., Suzhou (CN)

(72) Inventors: Liwei Zhao, Shanghai (CN); Songjing Jiang, Shanghai (CN); Xiaoshan Li, Shanghai (CN); Yu Mao, Shanghai (CN)

(73) Assignees: OPPLE LIGHTING CO., LTD., Shanghai (CN); SUZHOU OPPLE LIGHTING CO., LTD., Suzhou (CN)

( * ) Notice: Subject to any disclaimer, the term of this patent is extended or adjusted under 35 U.S.C. 154(b) by 315 days.

(21) Appl. No.: 18/214,975

(22) Filed: Jun. 27, 2023

(65) Prior Publication Data

US 2023/0366529 A1 Nov. 16, 2023

Related U.S. Application Data

(63) Continuation of application No. PCT/CN2021/140864, filed on Dec. 23, 2021.

(51) Int. Cl.

| | |
|---|---|
| ***F21V 23/06*** | (2006.01) |
| ***F21V 21/096*** | (2006.01) |
| ***F21V 21/35*** | (2006.01) |
| ***H01R 25/14*** | (2006.01) |

(52) U.S. Cl.

CPC ............ *F21V 21/096* (2013.01); *F21V 21/35* (2013.01); *F21V 23/06* (2013.01); *H01R 25/142* (2013.01)

(58) Field of Classification Search

None

See application file for complete search history.

(56) References Cited

FOREIGN PATENT DOCUMENTS

| | | | | | |
|---|---|---|---|---|---|
| CN | 104696789 | A | * | 6/2015 | .............. F21V 21/35 |
| CN | 104696797 | A | | 6/2015 | |
| CN | 206563232 | U | | 10/2017 | |
| CN | 206572363 | U | | 10/2017 | |
| CN | 107559676 | A | * | 1/2018 | ............ F21V 15/015 |
| CN | 112709947 | A | | 4/2021 | |
| CN | 214038015 | U | | 8/2021 | |
| EP | 3259525 | A1 | | 12/2017 | |
| EP | 3259525 | B1 | | 6/2019 | |
| EP | 3336420 | B1 | * | 2/2020 | .............. F21V 21/35 |

OTHER PUBLICATIONS

International Search Report of PCT Application No. PCT/CN2021/140864 dated Mar. 23, 2022 with English translation, (4p).

* cited by examiner

*Primary Examiner* — Tho D Ta

(74) *Attorney, Agent, or Firm* — Arch & Lake LLP; Shen Wang; Hao Tan

(57) ABSTRACT

The present disclosure provides a magnetic absorbing guide rail component and a lighting system. The magnetic absorbing guide rail component includes a strip rail, an insulating member, a pair of strip electrodes, a magnetic device, and a magnet. This disclosure adopts an aluminum profile as a strip rail, the strip rail has a relatively small width, and two strip electrodes are embedded in the insulating member.

11 Claims, 5 Drawing Sheets

MAGNETIC ABSORBING GUIDE RAIL COMPONENT AND LIGHTING SYSTEM

CROSS-REFERENCE TO RELATED APPLICATIONS

This application is based upon and claims the priority of PCT patent application No. PCT/CN2021/140864 filed on Dec. 23, 2021 which claims priority to the Chinese patent application No. 202011581915.8, filed on Dec. 28, 2020 and the Chinese patent application No. 202023232476.8, filed on Dec. 28, 2020, the entire contents of which are hereby incorporated by reference herein for all purposes.

TECHNICAL FIELD

The present disclosure relates to a field of luminaire device technologies, and more particularly, to a magnetic absorbing guide rail component and a lighting system.

BACKGROUND

With improvement of people's living standards, a role of lighting apparatuses is never only limited to lighting. People usually demand that lighting apparatuses not only have the basic function of lighting, but also have a certain decorative effect, so as to bring aesthetic experiences to users.

SUMMARY

The present disclosure provides a magnetic absorbing guide rail component and a lighting system.

The present disclosure provides a magnetic absorbing guide rail component. The magnetic absorbing guide rail component may include: a strip rail having a guide groove; an insulating member having an integrated structure, and having a connecting portion and a loading portion connected with the connecting portion, where the connecting portion may be capable of being snapped inside the guide groove, the loading portion may be located outside the strip rail, and both sides of the loading portion each may have a strip snap groove, and the loading portion may have an accommodating groove on a side away from the connecting portion; a pair of strip electrodes, each strip electrode being correspondingly in a pluggable connection with one of strip snap grooves of the loading portion of the insulating member; and at least one magnetic device that may be arranged in the accommodating groove.

The present disclosure further provides a lighting system, which may include the magnetic absorbing guide rail component described above.

It is to be understood that the foregoing general description and the following detailed description are exemplary and explanatory only and are not restrictive of the disclosure.

BRIEF DESCRIPTION OF THE DRAWINGS

The following is a detailed description of the specific implementations of the present disclosure combined with the accompanying drawings, which will make the technical solution and other beneficial effects of the present disclosure intelligible.

DETAILED DESCRIPTION

Figure 1:
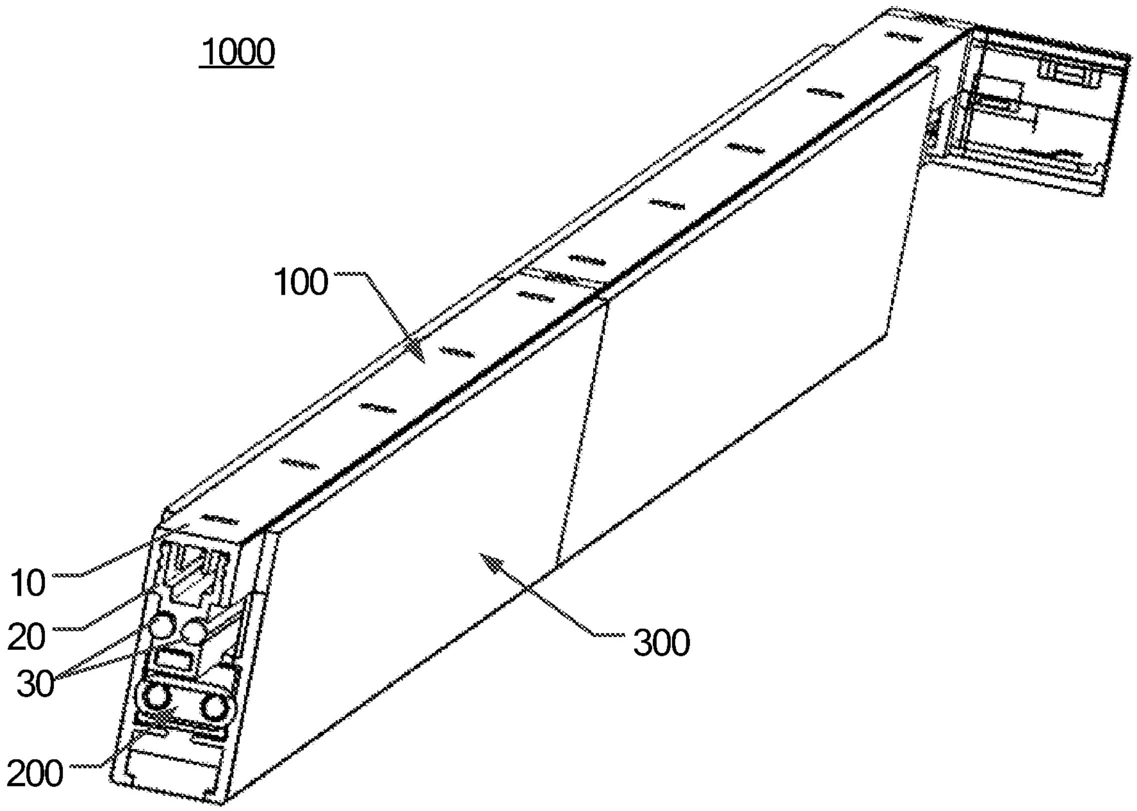
FIG. 1 is a schematic diagram of an overall structure of a lighting system provided by an example of the present disclosure.

The technical solutions of the examples of the present disclosure will be described clearly and completely combined with the drawings of the examples. It is obvious that the described examples below are only related to some examples of the present disclosure, but not all the examples. Based on the examples in the present disclosure, all other examples obtained by a skilled person in the field without creative labor shall fall within the scope of protection in the present disclosure.

In the present disclosure, unless otherwise explicitly specified and limited, a first feature being located "above" or "below" a second feature may include the first feature and the second feature being in direct contact with each other, or may also include the first feature and the second feature being not in direct contact with each other, but being in contact with each other through an additional feature between them. Moreover, the first feature being "on", "above", and "over" the second feature includes the first feature being directly above and diagonally above the second feature, or simply indicates that the first feature is horizontally higher than the second feature. The first feature being "below", "under" and "beneath" the second feature includes the first feature being directly below and diagonally below the second feature, or simply indicates that the first feature is horizontally lower than the second feature.

| Reference signs of the accompanying drawings used in this disclosure may include: | |
|---|---|
| 1000 lighting system; | 100 magnetic absorbing guide rail component; |
| 200 lighting apparatus; | 10 strip rail; |
| 20 insulating member; | 30 strip electrode; |
| 40 magnetic device; | 50 magnet; |
| 101 guide groove; | 102 bottom plate; |
| 103 side plate; | 104 first snap structure; |
| 104a first convex strip; | 104b first groove; |
| 105 reinforcing bar; | 106 limit groove; |
| 107 opening; | 2011 groove; |
| 201 connecting portion; | 202 loading portion; |
| 203 strip snap groove; | 204 accommodating groove; |
| 205 second snap structure; | 201a, 201b plate-like body; |

-continued

| Reference signs of the accompanying drawings used in this disclosure may include: | |
|---|---|
| 205a second convex strip; | 205b second groove; |
| 300 mating portion; | 2001 plate body; |
| 2002 connecting plate; | |
| 210 first mounting groove; | 220 second mounting groove; |
| 210a first accommodating groove; | 210b second accommodating groove; |
| 21 first fixing plate; | 220a third accommodating groove; |
| 220b fourth accommodating groove; | 22 second fixing plate; |
| 23 third fixing plate; | 60 lamp plate; |
| 70 optical element; | 80 spring piece; |
| 90 cover plate. | |

With respect to a roof-mounted lighting system, the lighting system includes a magnetic absorbing guide rail component and a lighting apparatus; and the lighting apparatus is mounted on a ceiling or a wall through the magnetic absorbing guide rail component. In the process of mounting the lighting system, not only the lighting system needs to be firmly fixed on the roof, but also a specific mounting position of the lighting system needs to be considered, so as to ensure better appearance of the entire lighting system. However, the magnetic absorbing guide rail component usually requires a large number of components for assembly in a complex mounting mode, making it inconvenient to mount the lighting apparatus. Specifically, the magnetic absorbing guide rail component is generally composed of guide rails, plastic profiles, electrodes, iron members, adapter members, and end caps, and the like. During the mounting process, the guide rail and the plastic profile are assembled firstly; then the two are fixed to the ceiling with screws; and finally, other parts together with the guide rail and the plastic profile are assembled to form a magnetic absorbing guide rail component.

With respect to the entire lighting system, due to disadvantages of the guide rail such as heavy structure and wide frame, the mounted lighting system may not have a simple appearance, resulting in a poor overall effect.

As illustrated in FIG. 1, FIG. 1 is a schematic diagram of an overall structure of a lighting apparatus provided by an example of the present disclosure.

This example provides a lighting system 1000, which includes a magnetic absorbing guide rail component 100, a lighting apparatus 200, and a mating portion 300. The mating portion 300 is used to mount the magnetic absorbing guide rail component 100 and the lighting apparatus 200, and the magnetic absorbing guide rail component 100 is magnetically coupled to the lighting apparatus 200.

Figure 2:
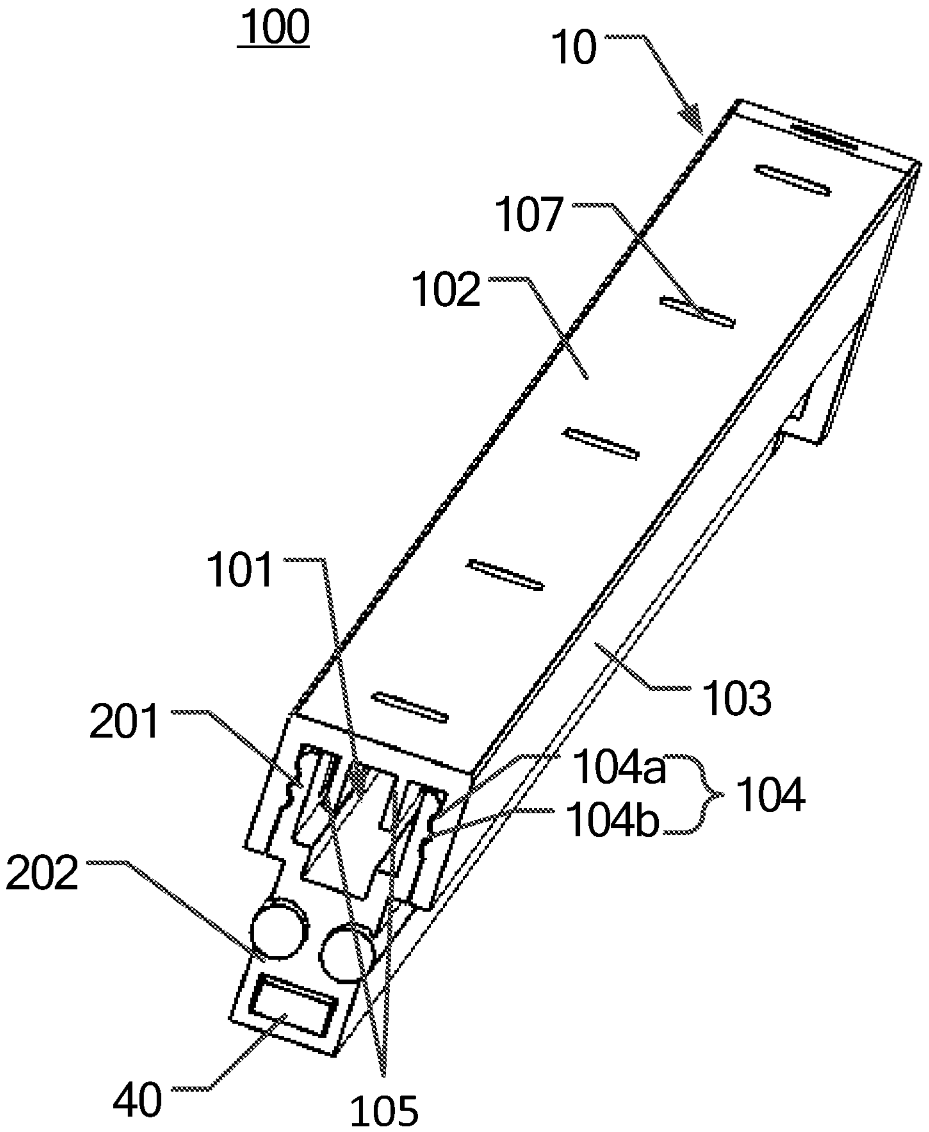
FIG. 2 is a structural schematic diagram of a magnetic absorbing guide rail component provided by an example of the present disclosure.
Figure 3:
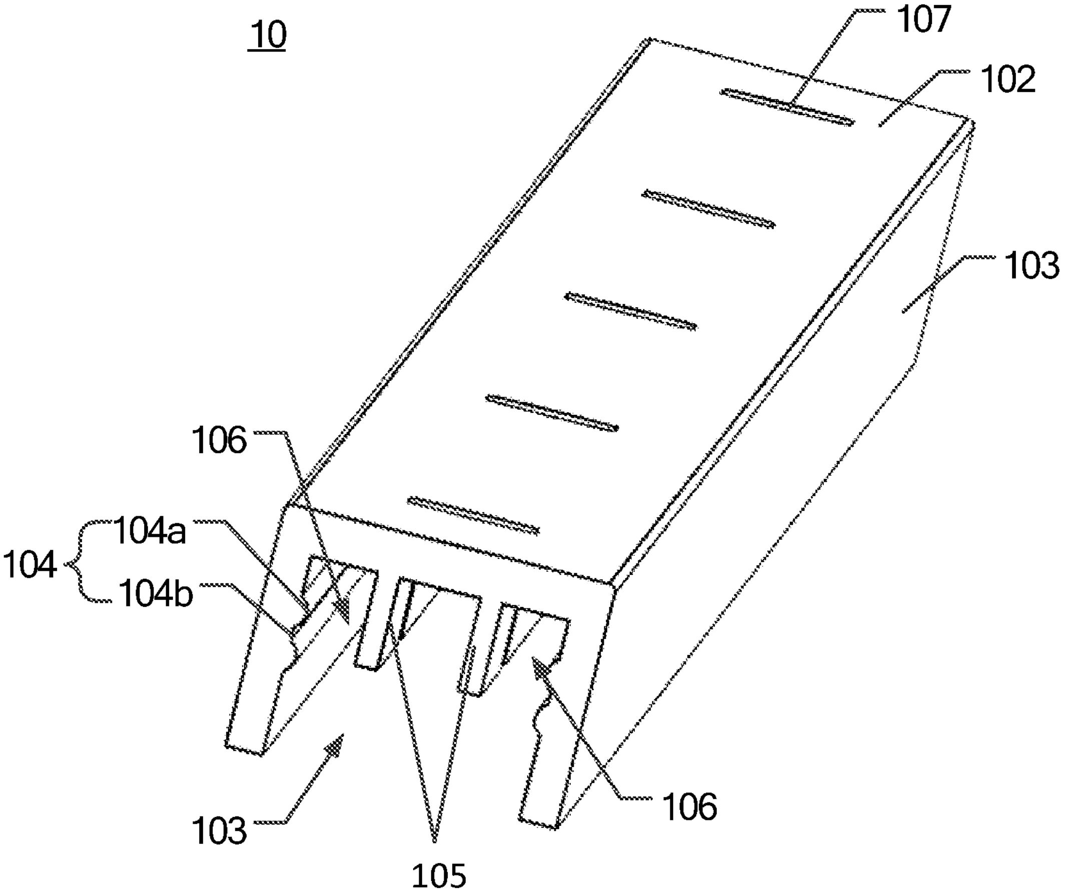
FIG. 3 is a structural schematic diagram of a strip rail provided by an example of the present disclosure.

As illustrated in FIG. 2 and FIG. 3, FIG. 2 is a structural schematic diagram of the magnetic absorbing guide rail component provided by the example of the present disclosure, and FIG. 3 is a structural schematic diagram of a strip rail provided by the example of the present disclosure.

As illustrated in FIG. 1, this example further provides a magnetic absorbing guide rail component 100, which includes a strip rail 10, an insulating member 20, a pair of strip electrodes 30, and a magnetic device 40.

The strip rail 10 includes a bottom plate 102 and side plates 103. Two opposite side plates 103 are vertically fixed on both side edges of the bottom plate 102, and the bottom plate 102 and the side plates 103 enclose to form a guide groove 101.

Two opposite surfaces of the side plates 103 each have a first snap structure 104. The first snap structure 104 includes a strip-shaped first convex strip **104*a* and a strip-shaped first groove 104*b*. The first groove 104*b* is arranged between two adjacent first convex strips 104*a*, or the first groove 104*b* is arranged between the first convex strip 104*a* and the bottom plate 102**.

The strip rail further includes two reinforcing bars 105, which are arranged parallel to each other in the guide groove 101. A limit groove 106 is formed between each reinforcing bar 105 and a side plate 103 closest thereto.

The strip rail 10 further includes two or more openings 107, which are evenly and equidistantly distributed. The opening 107 extends from the bottom plate 102 to the reinforcing bar 105 and is used to separate the reinforcing bar 105 into a plurality of segments. Such arrangement can facilitate working personnel to place the strip rail 10 in other mounting position such as a wall, a ceiling, etc., and then mount screws or bolts in the opening 107 to fix the same in the mounting position. The opening 107 separates the reinforcing bar 105 into a plurality of segments, which may prevent deformation of portions where screws or bolts are located from affecting other positions of the strip rail 10 during mounting, thereby preventing deformation of other portions of the strip rail 10 and helping maintain a straight state of the strip rail 10.

It should be noted that, in order to facilitate drilling holes on the guide rail and fixing the same to other mounting position such as a wall, a ceiling, and the like, a width of the strip rail is greater than 20 mm. In this example, the strip rail 10 is made of an aluminum profile, and may have a width less than 9 mm. Preferred widths of the strip rail 10 are 7 mm, 7.5 mm, 8 mm, 8.5 mm, or 9 mm; within these numerical ranges, the width of the strip rail 10 is extremely narrow, rendering reliable product strength, light weight, convenient overall disassembly and assembly, and saving packaging space.

Figure 4:
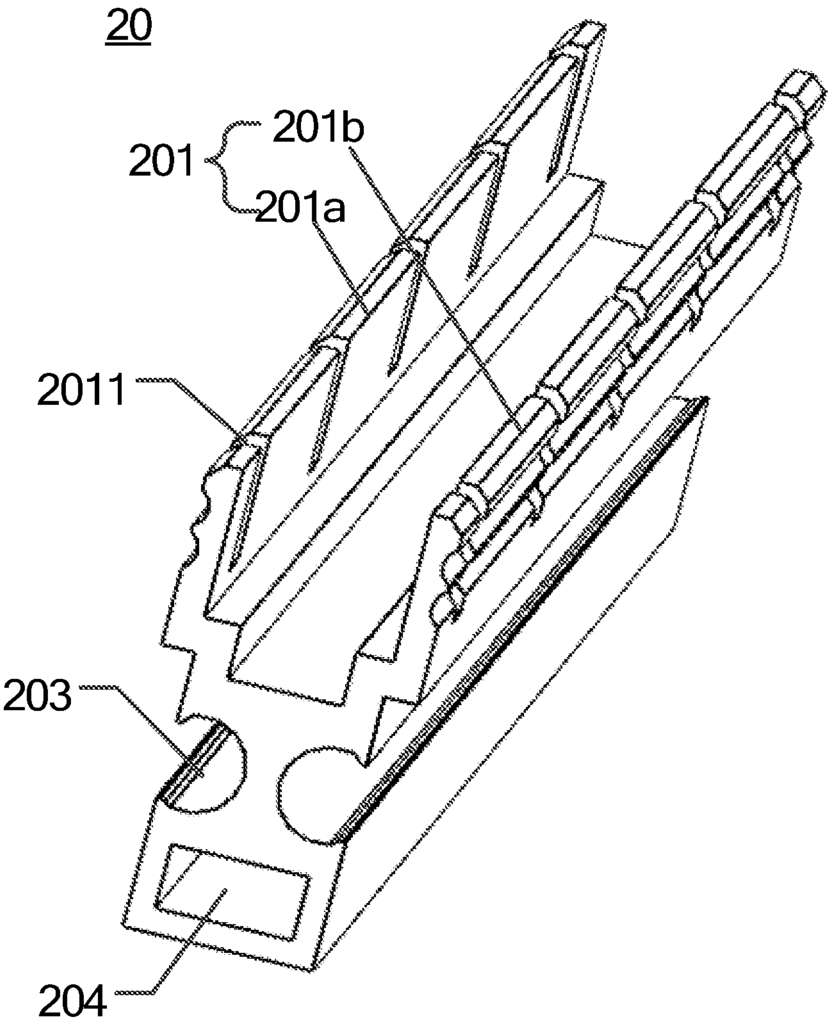
FIG. 4 is a structural schematic diagram of an insulating member provided by an example of the present disclosure.
Figure 5:
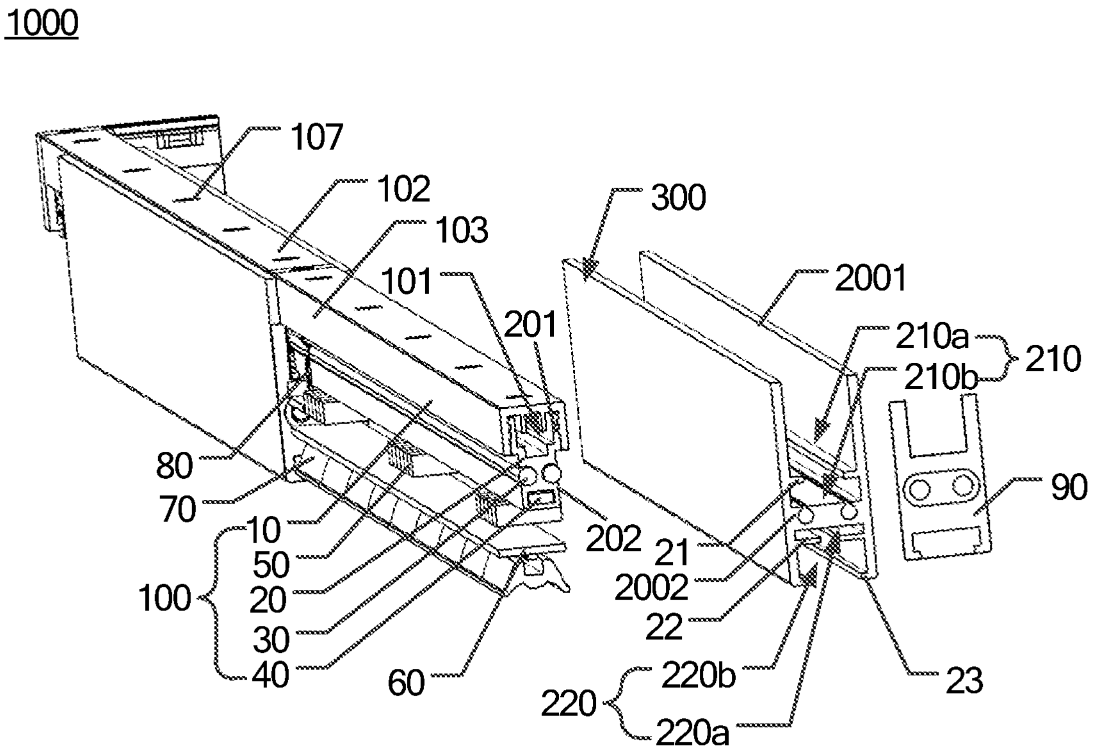
FIG. 5 is a partial exploded view of a lighting system provided by an example of the present disclosure.

As illustrated in FIG. 4, FIG. 4 is a structural schematic diagram of the insulating member provided by the example of the present disclosure.

The insulating member 20 has an integrated structure, and has a connecting portion 201 and a loading portion 202 connected with the connecting portion 201. The insulating member 20 is made of a plastic material or a rubber material, preferably an elastic plastic material or rubber material. The rubber material adopts EPDM; the EPDM is ethylene propylene diene monomer rubber; and ethylene propylene diene monomer rubber has superior oxidation resistance, ozone resistance, and corrosion resistance capabilities.

As illustrated in FIG. 1 to FIG. 5, FIG. 5 is a partial exploded view of the lighting system provided by the example of the present disclosure.

The connecting portion 201 of the insulating member 20 may be snapped inside the guide groove 101; the loading portion 202 is located outside the strip rail 10, and both sides thereof each have a strip snap groove 203; the loading portion 202 has an accommodating groove 204 on a side away from the connecting portion 201. The strip snap groove 203 is coupled to the accommodating groove 204 and is located on a side away from the connecting portion 201.

The connecting portion 201 has two plate-like bodies 201*a* and 201*b* which are arranged opposite to each other; each of the plate-like bodies 201*a*, 201*b* is provided with a plurality of grooves 2011; and the grooves 2011 are used to separate the plate-like bodies 201*a*, 201*b* into a plurality of segments.

An outer surface of each of the plate-like bodies 201*a*, 201*b* has a second snap structure 205 that can be adapted to the first snap structure 104. The second snap structure 205 includes a strip-shaped second convex strip 205*a* and a strip-shaped second groove 205*b*.

The first snap structure 104 and the second snap structure 205 are each a toothed structure or a wavy structure, as long as the first snap structure 104 and the second snap structure 205 can be firmly snapped with each other, and no special limitations will be given here.

In the case where the connecting portion 201 is mounted in the guide groove 101, the first snap structure 104 and the second snap structure 205 cooperate with each other. Specifically, in the case where the connecting portion 201 is mounted in the guide groove 101, the first snap structure 104 and the second snap structure 205 are snapped with each other, and at least one nut or bolt (not illustrated in the figure) is coupled to the connecting portion 201 from an outer wall of the side plate 103. Or, in the case where the connecting portion 201 may be mounted in the guide groove 101 in a snapping manner, the first snap structure 104 and the second snap structure 205 are snapped with each other in an interference fit.

Each strip electrode 30 is correspondingly in a pluggable connection with one of the strip snap grooves 203. Polarity of the pair of strip electrodes 30 may be determined according to user needs. For example, the cross-section of the strip electrode may be circular, trapezoidal, or "├" shaped, etc., as long as it may be ensured that the strip electrodes 30 can stably be in a pluggable connection with the strip snap grooves 203, and no details will be repeated here.

At least one magnetic device 40 is arranged within the accommodating groove 204. The material used in the magnetic device 40 is a thin plate structure containing iron; and in the case where there are two or more magnetic devices 40, the magnetic devices 40 are evenly and equidistantly distributed within the accommodating groove 204. Of course, the magnetic device 40 may also be arranged within the accommodating groove 204 as an integrated structure.

The mating portion 300 includes a plate body 2001 and a connecting plate 2002. Two plate bodies 2001 are arranged opposite to each other; and the connecting plate 2002 is used to connect and fix the two plate bodies 2001.

The connecting plate 2002 and an upper portion of the plate bodies 2001 enclose to form a first mounting groove 210. The first mounting groove 210 includes a first accommodating groove 210*a*, a second accommodating groove 210*b*, and a first fixing plate 21. Two opposite first fixing plates 21 are arranged inside the first mounting groove 210 and vertically coupled to the upper portion of the plate bodies 2001, so as to separate the first mounting groove 210 and form the first accommodating groove 210*a* and the second accommodating groove 210*b*; and the first accommodating groove 210*a* is in communication with the second accommodating groove 210*b*. The first fixing plate 21 and the plate bodies 2001 enclose to form the first accommodating groove 210*a*. The first fixing plate 21, the plate bodies 2001 and the connecting plate 2002 enclose to form the second accommodating groove 210*b*.

The connecting plate 2002 and a lower portion of the plate bodies 2001 enclose to form a second mounting groove 220. The second mounting groove 220 includes a third accommodating groove 220*a*, a fourth accommodating groove 220*b*, a second fixing plate 22, and a third fixing plate 23. Two opposite second fixing plates 22 are arranged inside the second mounting groove 220 and vertically coupled to the lower portion of the plate bodies 2001, so as to separate the second mounting groove 220 to form the third accommodating groove 220*a* and the fourth accommodating groove 220*b*; and the third accommodating groove 220*a* is in communication with the fourth accommodating groove 220*b*. The connecting plate 2002, the plate bodies 2001 and the second fixing plate 22 enclose to form the third accommodating groove 220*a*; and the second fixing plate 22, the plate bodies 2001 and the third fixing plate 23 enclose to form the fourth accommodating groove 220*b*.

In this example, the magnetic absorbing guide rail component 100 is arranged inside the first mounting groove 210; and the lighting apparatus 200 is arranged inside the second mounting groove 220.

The lighting apparatus 200 includes a mating portion magnet 50, a lamp plate 60, an optical element 70, a spring piece 80, and a cover plate 90.

At least one of the magnets 50 is arranged inside the first mounting groove 210. Specifically, the magnet 50 is mounted inside the second accommodating groove 210*b* and is arranged on a side of the loading portion 202 away from the connecting portion 201; and the magnet 50 and the magnetic device 40 absorb each other. The amount of the magnets 50 is the same as or different from the amount of the magnetic devices 40; and the magnets 50 are equidistantly distributed outside the accommodating groove 204.

The lamp plate 60 is mounted inside the third accommodating groove 220*a*; and a surface of the lamp plate 60 has a plurality of lamp beads for emitting light arranged in an array. The lamp plate 60 achieves an absorption function through the magnet 50 and the magnetic device 40 in the magnetic absorbing guide rail component 100.

The optical element 70 is arranged below the lamp plate 60, located inside the fourth accommodating groove 220*b*, and is arranged opposite to the lamp plate 60. When the lamp plate 60 emits light, light irradiates from a communication port between the third accommodating groove 220*a* and the fourth accommodating groove 220*b* onto the optical element 70, so that the optical element 70 further diffuses the light, thereby improving propagation range and effect of the light and improving user experience. The optical element 70 may be an optical device such as a light guide plate, a reflector, etc., and no details will be repeated here.

The spring piece 80 is arranged inside the mating portion, one end thereof is coupled to the strip electrode 30, and the other end is coupled to the lamp plate 60. When the magnetic absorbing guide rail component 100 and the lighting apparatus 200 magnetically absorb each other, the strip electrode 30 and the lamp plate 60 are electrically connected with each other, and the lighting system 1000 is in an operation state.

The cover plate 90 covers to close a side face of the entire lighting apparatus 200, that is, seals end portions of the magnetic absorbing guide rail component 100 and the lighting apparatus 200, thereby making the lighting system 1000 appear cleaner and more aesthetically pleasing, and improving user experience.

Hereinafter, the mounting operation of the lighting system 1000 is illustrated in details.

Firstly, the strip rail 10 is mounted on a mounting position such as a wall, a ceiling, etc., by using screws or bolts.

Secondly, the strip electrode 30, the magnetic device 40, and other components are mounted on the insulating member 20.

Specifically, the strip electrode 30 is inserted into the strip snap groove 203 matched therewith, and the magnetic device 40 is accommodated in the accommodating groove 204.

Thirdly, the insulating member 20 is embedded into the guide groove 101 of the strip rail 10. In the embedding process, when the connecting portion 201 is snapped inside the guide groove 101, the first snap structure 104 and the second snap structure 205 are snapped with each other in an interference fit; and the plate-like bodies 201*a*, 201*b* are located in the limit groove 106.

Specifically, in the case where the connecting portion 201 is snapped inside the guide groove 101, the first convex strip 104*a* is embedded in the second groove 205*b*, and the second convex strip 205*a* is embedded in the first groove 104*b*, thereby making mounting and dismounting of the strip rail 10 and the insulating member 20 convenient, which not only saves operation time, but also provides stable protection.

In the case where the connecting portion is snapped inside the guide groove 101, the plate-like bodies 201*a*, 201*b* are located in the limit groove 106. During the snapping process, the groove 2011 facilitates embedding the plate-like bodies 201*a*, 201*b* into the guide groove 101, without touching screws or bolts fixed at the opening 107, which is favorable for improving firmness of the first snap structure 104 and the second snap structure 205.

Fourthly, the lamp plate 60 and the optical element 70 are mounted inside the lighting apparatus 200.

Specifically, the lamp plate 60 is arranged inside the third accommodating groove 220*a*; and the optical element 70 is mounted in the fourth accommodating groove 220*b*, and is fixed by the third fixing plate 23. The lamp plate 60 is arranged opposite to the optical element 70, and light emitted by the lamp plate 60 is dispersed through the optical element 70.

Fifthly, the lighting apparatus 200 is snapped onto the magnetic absorbing guide rail component 100, so that the magnetic absorbing guide rail component 100 is arranged in the first mounting groove 210, and the magnet 50 in the magnetic absorbing guide rail component 100 absorbs the lamp plate 60, that is, the lamp plate 60 is firmly fixed to other mounting position such as a wall or a ceiling in a magnetic absorbing quick connection mode.

Specifically, the strip rail 10 and the connecting portion 201 of the insulating member 20 are provided in the first accommodating groove 210*a*; and the loading portion 202 of the insulating member 20, the strip electrode 30, the magnetic device 40, the magnet 50, and the like are arranged in the second accommodating groove 210*b*. The strip electrode 30 is coupled to the lamp plate 60 through a spring piece 80. A driving apparatus (not illustrated in the figure) is further arranged in the second groove 205*b*; and the driving apparatus is used to control ON and OFF of a light on the lamp plate 60.

It should be noted that this example provides a lighting system 1000, which further includes an adapter such as a two-way adapter, a three-way adapter, etc. The adapter is used to extend the magnetic absorbing guide rail component 100, so that the magnetic absorbing guide rail component 100 can be applicable to any environment with different spatial layout. Of course, the lighting system 1000 may further include other components, and no details will be repeated here.

This example provides a magnetic absorbing guide rail component 100 which adopts an aluminum profile as the strip rail 10. The strip rail 10 has a relatively small width, and two strip electrodes 30 are embedded in the insulating member 20. Therefore, during the mounting process of the magnetic absorbing guide rail component, the product is simple in assembly, simple in packaging, and convenient in transportation, which greatly reduces the amount of packaging materials without consuming a lot of manpower and material resources, and is favorable for saving space. In addition, the magnetic absorbing guide rail component can avoid damage caused by collision during transportation, thereby saving costs, especially reducing damage during transportation.

This example provides a lighting system, which includes the magnetic absorbing guide rail component according to the present disclosure, which has a small structure, light weight, reliable strength, and is easy for mounting. Therefore, when the magnetic absorbing guide rail component is mounted together with the lighting apparatus, the lighting system can have an overall structure that is relatively small, and has advantages such as reliable strength, light weight, simple appearance, convenient disassembly and assembly, cost saving, and the like.

An objective of the present disclosure is to provide a magnetic absorbing guide rail component and a lighting system, so as to solve the technical problems of heavy structure, wide frame and complicated mounting of the guide rail.

In order to achieve the above purpose, the present disclosure provides a magnetic absorbing guide rail component, which includes: a strip rail, having a guide groove; an insulating member, having an integrated structure, and having a connecting portion and a loading portion connected with the connecting portion, where the connecting portion is capable of being snapped inside the guide groove, the loading portion is located outside the strip rail, and both sides of the loading portion each have a strip snap groove, and the loading portion has an accommodating groove on a side away from the connecting portion; a pair of strip electrodes, each strip electrode being correspondingly in a pluggable connection with one of strip snap grooves of the loading portion of the insulating member; and at least one magnetic device, arranged in the accommodating groove.

Further, the strip snap groove is coupled to the accommodating groove and is located on a side away from the connecting portion.

Further, the strip rail comprises: a bottom plate; and two opposite side plates, vertically arranged on both side edges of the bottom plate, the bottom plate and the side plates enclosing to form the guide groove. Two opposite surfaces of the side plates each have a first snap structure; the connecting portion has two plate-like bodies arranged opposite to each other, an outer surface of each plate-like body has a second snap structure adapted to the first snap structure; and in the case where the connecting portion is mounted in the guide groove, the first snap structure and the second snap structure cooperate with each other.

Further, in the case where the connecting portion is mounted in the guide grooving in a snapping manner, the first snap structure and the second snap structure are snapped with each other in interference fit; or, in the case where the connecting portion is mounted in the guide groove, the first snap structure and the second snap structure are snapped with each other, and at least one nut or bolt is coupled to the connecting portion from an outer wall of the side plates.

Further, the strip rail further comprises two reinforcing bars arranged parallel to each other in the guide groove, a limit groove is formed between each reinforcing bar and a side plate closest to the reinforcing bar, and in the case where the connecting portion is snapped in the guide groove, the plate-like body is located within the limit groove.

Further, the strip rail further comprises two or more openings which are evenly and equidistantly distributed, and the openings extend from the bottom plate to the reinforcing bar and is used to separate the reinforcing bar into a plurality of segments.

Further, each of the plate-like bodies is provided with a plurality of grooves, and the grooves are used to separate the plate-like bodies into a plurality of segments.

Further, a width of the strip rail is less than 9 mm.

Further, a material used in the magnetic device is a thin plate structure containing iron; and in the case where there are two or more magnetic devices, the magnetic devices are evenly and equidistantly distributed within the accommodating groove.

In order to achieve the above purpose, the present disclosure further provides a lighting system, which comprises the magnetic absorbing guide rail component described above.

Further, the lighting system further comprises: a lighting apparatus, arranged below the magnetic absorbing guide rail component; and a mating portion, used to mount the magnetic absorbing guide rail component and the lighting apparatus, the magnetic absorbing guide rail component being magnetically coupled to the lighting apparatus.

Further, the mating portion comprises: two plate bodies arranged opposite to each other; and a connecting plate, used to connect and fix the two plate bodies. The connecting plate and an upper portion of the plate bodies enclose to form a first mounting groove; the connecting plate and a lower portion of the plate bodies enclose to form a second mounting groove; the magnetic absorbing guide rail component is arranged inside the first mounting groove; and the lighting apparatus is arranged inside the second mounting groove.

Further, the lighting apparatus further comprises: two opposite first fixing plates, arranged inside the first mounting groove and located on the upper portion of the plate bodies, the first fixing plates being used to separate the first mounting groove to form a first accommodating groove and a second accommodating groove; or two opposite second fixing plates, arranged inside the second mounting groove and located on the lower portion of the plate bodies, the second fixing plates being used to separate the second mounting groove to form a third accommodating groove and a fourth accommodating groove.

Further, the magnetic absorbing guide rail component is arranged inside the first accommodating groove; and at least one magnet is arranged inside the second accommodating groove, and the magnet and the magnetic device absorb each other.

Further, the lighting apparatus further comprises: a lamp plate, arranged in the third accommodating groove, the magnetic device in the magnetic absorbing guide rail component absorbing the lamp plate; and an optical element, arranged inside the fourth accommodating groove.

Technical effects of the present disclosure are that, the present disclosure provides a magnetic absorbing guide rail component and a lighting system; the magnetic absorbing guide rail component adopts an aluminum profile as a strip rail; the strip rail has a relatively small width, and two strip electrodes are embedded in an insulating member. Therefore, during the mounting process of the magnetic absorbing guide rail component, the product is simple in assembly, simple in packaging, and convenient in transportation, which greatly reduces the amount of packaging materials without consuming a lot of manpower and material resources, and is favorable for saving space. In addition, the magnetic absorbing guide rail component may avoid damage caused by collision during transportation, thereby saving costs, and especially reducing damage during transportation.

Furthermore, the lighting system includes the magnetic absorbing guide rail component, which has small structure, light weight, reliable strength, and is easy for mounting. Therefore, in the case where the magnetic absorbing guide rail component is mounted together with the lighting luminaire, the lighting apparatus may have an overall structure that is relatively small, and has advantages such as reliable strength, light weight, simple appearance, convenient disassembly and assembly, cost saving, and the like.

The above provides a detailed introduction to the magnetic absorbing guide rail component and lighting system provided in the examples of the present disclosure. Specific examples are applied in this disclosure to explain the principles and implementation methods of the present application. The explanations of the above examples are only used to help understand the technical solution and its core ideas of the present application. Ordinary technical personnel in this field should understand that they can still modify the technical solutions recorded in the aforementioned examples, or equivalently replace some of the technical features, and these modifications or replacements do not make the essence of the corresponding technical solutions deviate from the scope of the technical solutions of the various examples of the present disclosure.

What is claimed is:

1. A magnetic absorbing guide rail component, comprising:

a strip rail having a guide groove;

an insulating member having an integrated structure, and having a connecting portion and a loading portion connected with the connecting portion, wherein the connecting portion is capable of being snapped inside the guide groove, the loading portion is located outside the strip rail, and both sides of the loading portion each have a strip snap groove, and the loading portion has an accommodating groove on a side away from the connecting portion;

a pair of strip electrodes, each strip electrode being correspondingly in a pluggable connection with one of strip snap grooves of the loading portion of the insulating member; and at least one magnetic device that is arranged in the accommodating groove;

wherein the strip rail comprises:

a bottom plate; and two opposite side plates, vertically arranged on both side edges of the bottom plate, the bottom plate and the side plates enclosing to form the guide groove, and wherein two opposite surfaces of the side plates each have a first snap structure;

the connecting portion has two plate-like bodies arranged opposite to each other, an outer surface of each plate-like body has a second snap structure adapted to the first snap structure; and in a case where the connecting portion is mounted in the guide groove, the first snap structure and the second snap structure cooperate with each other;

wherein the strip rail further comprises two reinforcing bars arranged parallel to each other in the guide groove, a limit groove is formed between each reinforcing bar and a side plate closest to the reinforcing bar, and in the case where the connecting portion is snapped in the guide groove, the plate-like body is located within the limit groove.

2. The magnetic absorbing guide rail component according to claim 1, wherein the strip snap groove is coupled to the accommodating groove and is located on a side away from the connecting portion.

3. The magnetic absorbing guide rail component according to claim 1, wherein, in the case where the connecting portion is mounted in the guide groove in a snapping manner, the first snap structure and the second snap structure are snapped with each other in interference fit; or, in the case where the connecting portion is mounted in the guide groove, the first snap structure and the second snap structure are snapped with each other, and at least one nut or bolt is coupled to the connecting portion from an outer wall of the side plates.

4. The magnetic absorbing guide rail component according to claim 1, wherein the strip rail further comprises two or more openings which are evenly and equidistantly distributed, and the openings extend from the bottom plate to the reinforcing bar and is used to separate the reinforcing bar into a plurality of segments.

5. The magnetic absorbing guide rail component according to claim 1, wherein each of the plate-like bodies is provided with a plurality of grooves, and the grooves are used to separate the plate-like bodies into a plurality of segments.

6. The magnetic absorbing guide rail component according to claim 1, wherein a width of the strip rail 1s less than 9 mm.

7. The magnetic absorbing guide rail component according to claim 1, wherein a material used in the magnetic device is a thin plate structure containing iron; and in a case where there are two or more magnetic devices, the magnetic devices are evenly and equidistantly distributed within the accommodating groove.

8. A lighting system, comprising a magnetic absorbing guide rail component wherein the magnetic absorbing guide rail component comprises:

a strip rail having a guide groove;

an insulating member having an integrated structure, and having a connecting portion and a loading portion connected with the connecting portion, wherein the connecting portion is capable of being snapped inside the guide groove, the loading portion is located outside the strip rail, and both sides of the loading portion each have a strip snap groove, and the loading portion has an accommodating groove on a side away from the connecting portion;

a pair of strip electrodes, each strip electrode being correspondingly in a pluggable connection with one of strip snap grooves of the loading portion of the insulating member; and at least one magnetic device that is arranged in the accommodating groove;

wherein the lighting system further comprising:

a lighting apparatus, arranged below the magnetic absorbing guide rail component; and a mating portion, used to mount the magnetic absorbing guide rail component and the lighting apparatus, the magnetic absorbing guide rail component being magnetically coupled to the lighting apparatus;

wherein the mating portion comprises:

two plate bodies arranged opposite to each other; and a connecting plate, used to connect and fix the two plate bodies, wherein the connecting plate and an upper portion of the plate bodies enclose to form a first mounting groove;

the connecting plate and a lower portion of the plate bodies enclose to form a second mounting groove;

the magnetic absorbing guide rail component is arranged inside the first mounting groove; and the lighting apparatus is arranged inside the second mounting groove.

9. The lighting system according to claim 8, wherein the lighting apparatus further comprises:

two opposite first fixing plates, arranged inside the first mounting groove and located on the upper portion of the plate bodies, the first fixing plates being used to separate the first mounting groove to form a first accommodating groove and a second accommodating groove; or two opposite second fixing plates, arranged inside the second mounting groove and located on the lower portion of the plate bodies, the second fixing plates being used to separate the second mounting groove to form a third accommodating groove and a fourth accommodating groove.

10. The lighting system according to claim 9, wherein the magnetic absorbing guide rail component is arranged inside the first accommodating groove; and at least one magnet is arranged inside the second accommodating groove, and the magnet and the magnetic device absorb each other.

11. The lighting system according to claim 9, wherein the lighting apparatus further comprises:

a lamp plate, arranged in the third accommodating groove, the magnetic device in the magnetic absorbing guide rail component absorbing the lamp plate; and an optical element, arranged inside the fourth accommodating groove.

* * * * *